US011443364B2

(12) United States Patent
DeFrancesco et al.

(10) Patent No.: US 11,443,364 B2
(45) Date of Patent: Sep. 13, 2022

(54) REAL-TIME MANAGEMENT OF INVENTORY TRANSFERS AND RELATED USER INTERFACES

(71) Applicant: Shopify Inc., Ottawa (CA)

(72) Inventors: Nicolas DeFrancesco, Alliston (CA); Stefan Slehta, Oakville (CA)

(73) Assignee: Shopify Inc., Ottawa (CA)

( * ) Notice: Subject to any disclaimer, the term of this patent is extended or adjusted under 35 U.S.C. 154(b) by 123 days.

(21) Appl. No.: 17/024,939

(22) Filed: Sep. 18, 2020

(65) Prior Publication Data

US 2022/0092680 A1 Mar. 24, 2022

(51) Int. Cl.
*G06Q 30/06* (2012.01)
*G06Q 10/08* (2012.01)
*G06Q 10/06* (2012.01)
*G06F 16/9537* (2019.01)
*G06F 16/2458* (2019.01)

(52) U.S. Cl.
CPC ..... *G06Q 30/0639* (2013.01); *G06F 16/2477* (2019.01); *G06F 16/9537* (2019.01); *G06Q 10/06315* (2013.01); *G06Q 10/087* (2013.01); *G06Q 10/0836* (2013.01); *G06Q 10/0838* (2013.01); *G06Q 30/0635* (2013.01)

(58) Field of Classification Search
CPC .... G06Q 10/087; G06Q 10/08; G06Q 10/083; G06Q 10/08355; G06Q 10/0834; G06Q 30/0639; G06Q 50/28; G06Q 30/0641; G06Q 30/0601
See application file for complete search history.

(56) References Cited

U.S. PATENT DOCUMENTS 7,084,737 B1 *  8/2006  Moore ................. G06Q 20/203
                                                           705/28
7,231,380 B1 *  6/2007  Pienkos ................ G06Q 30/02
                                                           705/28
7,257,552 B1 *  8/2007  Franco ................. G06Q 10/08
                                                           705/28

(Continued)

OTHER PUBLICATIONS

Oracle Inventory User's Guide—Chapters 8 and 9 Oracle, Release 11i, vol. 1, Jan. 2000 (Year: 2000).*

(Continued)

*Primary Examiner* — Scott L Jarrett
(74) *Attorney, Agent, or Firm* — Rowand LLP

(57) ABSTRACT

A computer-implemented is disclosed. The method includes: receiving a selection of a product; determining that there is insufficient available inventory of the product at a pick-up location; in response to the determining: selecting, based on inventory tracking data for the product, a first inventory location having available inventory of the product; determining, based on the first inventory location, the at least one possible pick-up location, and inventory transfer data, an inventory transfer time from the first inventory location to the pick-up location; and determining an earliest time of availability of a first quantity of the product at the pick-up location based on the inventory transfer time, and transmitting, to a customer device, the earliest time of availability of the first quantity of the product at the pick-up location for presenting, by the customer device, as available inventory at the pick-up location for pick up after the earliest time of availability.

17 Claims, 7 Drawing Sheets

(56) References Cited

U.S. PATENT DOCUMENTS

| | | | |
|---|---|---|---|
| 8,301,504 B2* | 10/2012 | Swamy | G06Q 30/06 705/26.9 |
| 9,384,654 B1* | 7/2016 | Chillappa | G06Q 10/08 |
| 9,796,529 B1* | 10/2017 | Hoareau | G05D 1/0282 |
| 9,960,986 B2* | 5/2018 | Tao | H04L 41/5051 |
| 10,181,142 B2* | 1/2019 | Rosenfeld | G06Q 10/06316 |
| 10,453,004 B2* | 10/2019 | Davidson | G06Q 10/08355 |
| 10,489,496 B1* | 11/2019 | Sen | H04N 21/4122 |
| 10,614,410 B2* | 4/2020 | Gillen | G01S 19/14 |
| 10,723,555 B2* | 7/2020 | Hance | B65G 67/04 |
| 10,755,275 B1* | 8/2020 | Jen | G06Q 20/407 |
| 10,776,745 B2* | 9/2020 | Goodman | G06Q 10/0833 |
| 10,792,814 B2* | 10/2020 | Hitchcock | H04L 67/125 |
| 10,818,186 B2* | 10/2020 | Ripert | G06Q 30/0635 |
| 10,891,624 B2* | 1/2021 | Varma | G06Q 20/202 |
| 10,943,289 B2* | 3/2021 | Mattingly | G06Q 10/083 |
| 2002/0072986 A1* | 6/2002 | Aram | G06Q 10/087 705/26.81 |
| 2003/0177072 A1* | 9/2003 | Bared | G06Q 30/0623 705/26.81 |
| 2004/0054549 A1* | 3/2004 | Chittenden | G08G 5/0095 705/338 |
| 2007/0150369 A1* | 6/2007 | Zivin | G06Q 30/0631 705/26.7 |
| 2007/0221791 A1* | 9/2007 | Voelk | G06Q 10/08 246/1 R |
| 2008/0208699 A1* | 8/2008 | Tsunasawa | G07F 9/026 705/21 |
| 2011/0040651 A1* | 2/2011 | Swamy | G06Q 30/0601 705/27.1 |
| 2014/0036048 A1* | 2/2014 | Furbeck | H04W 4/02 348/61 |
| 2014/0249947 A1* | 9/2014 | Hicks | G06Q 10/087 705/21 |
| 2014/0279238 A1* | 9/2014 | Jones | G06Q 30/0617 705/26.43 |
| 2014/0279294 A1* | 9/2014 | Field-Darragh | G06Q 30/0282 705/28 |
| 2014/0279664 A1* | 9/2014 | Lievens | G06Q 10/087 705/339 |
| 2014/0379605 A1* | 12/2014 | Herjolfsson | G06Q 10/10 705/333 |
| 2015/0095191 A1* | 4/2015 | Hu | G06Q 30/0613 |
| 2015/0100433 A1* | 4/2015 | Choy | G06Q 30/0635 705/26.41 |
| 2017/0255900 A1* | 9/2017 | High | G06Q 10/087 |
| 2018/0025318 A1* | 1/2018 | Baggott | G06Q 10/047 705/334 |
| 2018/0218312 A1* | 8/2018 | Smith | G06Q 30/0633 |
| 2019/0019135 A1* | 1/2019 | Vij | G06Q 10/083 |
| 2019/0062055 A1* | 2/2019 | Hance | G05D 1/021 |
| 2019/0087777 A1* | 3/2019 | Turner | G06Q 30/0609 |
| 2019/0251621 A1* | 8/2019 | Harmon | G06Q 20/12 |
| 2019/0325389 A1* | 10/2019 | Dearing | G06Q 10/0833 |
| 2020/0043077 A1* | 2/2020 | Turner | G06Q 30/0641 |
| 2020/0151667 A1* | 5/2020 | Mangalassery Gregory | G06Q 10/08355 |
| 2020/0183414 A1* | 6/2020 | Shih | G06Q 10/0832 |
| 2020/0219055 A1* | 7/2020 | Nagar | G06Q 10/0833 |
| 2020/0231100 A1* | 7/2020 | Haque | H04W 4/029 |
| 2020/0250610 A1* | 8/2020 | Schoening | G06K 7/10366 |
| 2020/0250614 A1* | 8/2020 | Zhu | G07C 9/00571 |
| 2020/0279216 A1* | 9/2020 | Smith | G06Q 10/0834 |
| 2020/0387857 A1* | 12/2020 | Smith | G06F 21/31 |
| 2021/0390614 A1* | 12/2021 | Hill | G06Q 30/0635 |
| 2021/0398059 A1* | 12/2021 | Gravelle | G06Q 30/04 |
| 2022/0036305 A1* | 2/2022 | Glick | G06Q 10/0875 |
| 2022/0036310 A1* | 2/2022 | Heinla | G06Q 10/083 |
| 2022/0092516 A1* | 3/2022 | Hunter | G06N 20/00 |

OTHER PUBLICATIONS

Oracle Transportation User's Guide Oracle, Release 11i, May 2003 (Year: 2003).*

* cited by examiner

REAL-TIME MANAGEMENT OF INVENTORY TRANSFERS AND RELATED USER INTERFACES

FIELD

The present disclosure relates to electronic commerce and, in particular, to systems and methods for managing inventory of products that are offered for sale electronically or on-line.

BACKGROUND

An electronic or e-commerce platform may offer customers options for shipping (e.g. home delivery) or local pickup (e.g. in-store pickup) of their purchased products. In existing systems, for the local pickup option, current inventory of a product in a prospective buyer's locality may be required in order for a merchant to take and/or fulfill an order for that product from that buyer.

BRIEF DESCRIPTION OF THE DRAWINGS

Embodiments will be described, by way of example only, with reference to the accompanying figures wherein.

DETAILED DESCRIPTION

Figure 1:
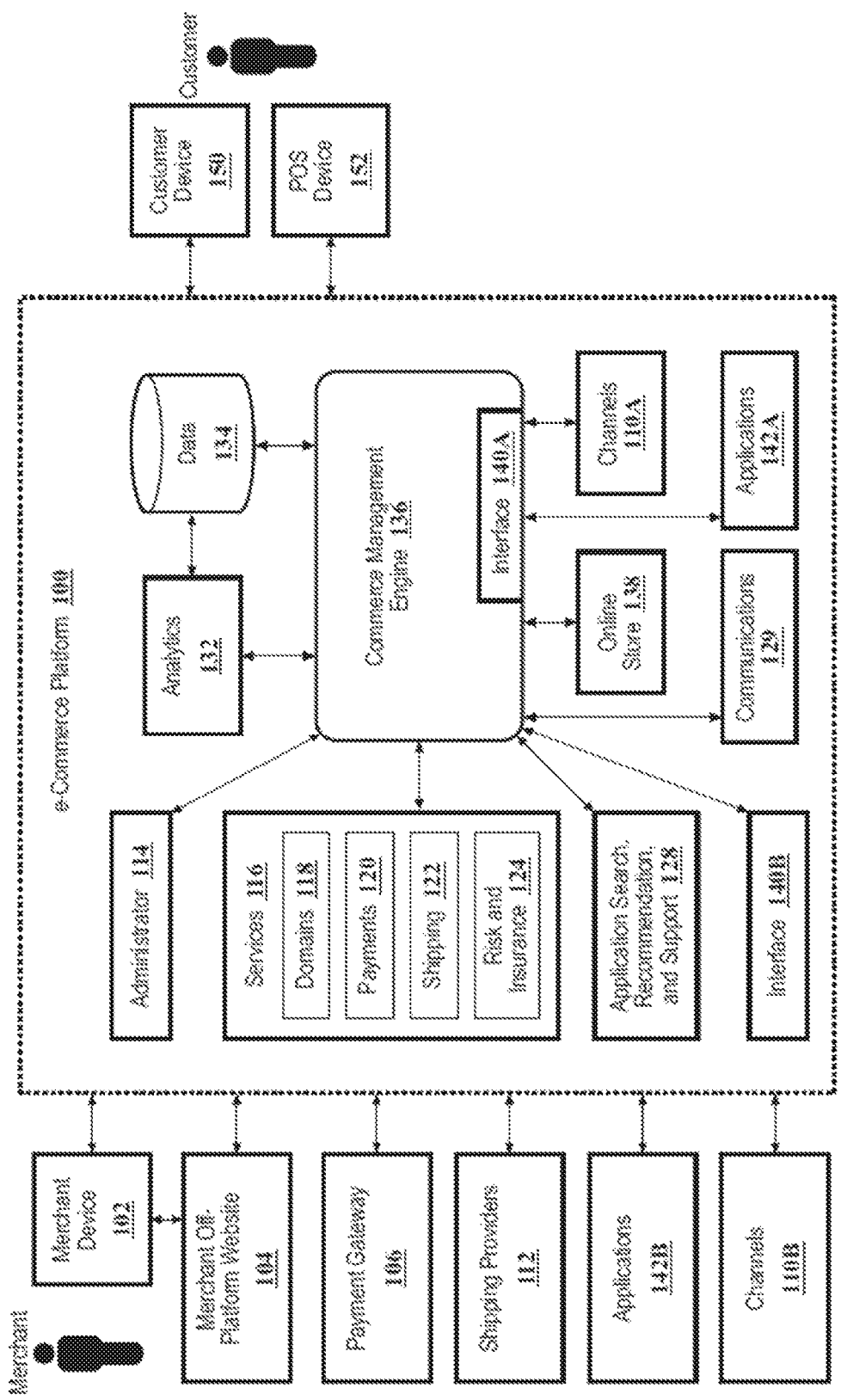
FIG. 1 is a block diagram of an e-commerce platform, according to an example embodiment.

In one aspect, the present application discloses a computer-implemented method of controlling inventory availability associated with products. The method includes: receiving, from a customer device, a selection of a product; determining, based on stored inventory data for at least one possible pick-up location for the product, that there is insufficient available inventory of the product at the at least one possible pick-up location; in response to determining that there is insufficient available inventory of the product at the at least one possible pick-up location: selecting, based on inventory tracking data for the product, a first inventory location having available inventory of the product; determining, based on the first inventory location, the at least one possible pick-up location, and inventory transfer data, an inventory transfer time from the first inventory location to the at least one possible pick-up location; and determining an earliest time of availability of a first quantity of the product at the at least one possible pick-up location based on the inventory transfer time, and transmitting, to the customer device, the earliest time of availability of the first quantity of the product at the at least one possible pick-up location for presenting, by the customer device, as available inventory at the at least one pick-up location for pick up after the earliest time of availability.

Conveniently, in this way, local pick-up may be offered to customers even when pick-up locations in a given customer's area do not have a given product on-hand at the time of order.

In some implementations, the at least one possible pick-up location may be designated based on at least one of a selection by a customer, account configuration for the customer, or a detected current location of the customer device.

In some implementations, determining the inventory transfer time may include querying a transfer service for transfer time data.

In some implementations, the inventory transfer data may indicate fixed route schedule data for one or more inventory transfer vehicles, and the inventory transfer time may be determined based on the fixed route schedule data.

In some implementations, the inventory transfer data may include real-time location tracking data for one or more inventory transfer vehicles.

In some implementations, the at least one possible pick-up location may include two or more possible pick-up locations, and determining the earliest time of availability of the first quantity of the product may include: for each of the two or more possible pick-up locations: determining an inventory transfer time from the first inventory location to the possible pick-up location; and determining an earliest time of availability of the first quantity of the product at the possible pick-up location based on the respective inventory transfer time.

In some implementations, transmitting the earliest time of availability of the first quantity of the product to the customer device may include: obtaining identifying information for the two or more possible pick-up locations; and transmitting, to the customer device, the identifying information and the earliest times of availability of the first quantity of the product at the two or more possible pick-up locations.

In some implementations, the method may further include: receiving, from the customer device, a request to process an order for the product, the request including identifying information for the at least one possible pick-up location; and transmitting, to the customer device, a pick-up time associated with the order.

In some implementations, the earliest time of availability of the first quantity of the product at the at least one possible pick-up location may be transmitted to the customer device responsive to determining that at least one condition relating to an order for the product is satisfied.

In some implementations, the method may further include: selecting, based on the inventory tracking data for the product, at least one second inventory location having available inventory of the product; and determining, based on the at least one second inventory location, the at least one possible pick-up location, and inventory transfer data, inventory transfer times from the at least one second inventory location to the at least one possible pick-up location, wherein the earliest time of availability of the first quantity of the product at the at least one possible pick-up location is determined based on the inventory transfer times associated with the first inventory location and the at least one second inventory location.

In another aspect, the present application discloses an inventory control engine. The inventory control engine includes a database storing data for a plurality of product items, a processor, and a memory storing computer-executable instructions. The instructions, when executed by the processor, are to cause the processor to: receive, from a customer device, a selection of a product; determine, based on stored inventory data for at least one possible pick-up location for the product, that there is insufficient available inventory of the product at the at least one possible pick-up location; in response to determining that there is insufficient available inventory of the product at the at least one possible pick-up location: select, based on inventory tracking data for the product, a first inventory location having available inventory of the product; determine, based on the first inventory location, the at least one possible pick-up location, and inventory transfer data, an inventory transfer time from the first inventory location to the at least one possible pick-up location; and determine an earliest time of availability of a first quantity of the product at the at least one possible pick-up location based on the inventory transfer time, and transmit, to the customer device, the earliest time of availability of the first quantity of the product at the at least one possible pick-up location for presenting, by the customer device, as available inventory at the at least one pick-up location for pick up after the earliest time of availability.

In another aspect, the present application discloses a non-transitory, computer-readable medium storing processor-executable instructions that, when executed by one or more processors, are to cause the one or more processors to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g. manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g. change, update, etc.) will be referred to as variable product data. More specifically, variable product data refers to product data that may be changed automatically or at the discretion of the merchant offering the product.

Example E-Commerce Platform

In some embodiments, the methods disclosed herein may be performed on or in association with an e-commerce platform. An example of an e-commerce platform will now be described.

FIG. 1 illustrates an e-commerce platform 100, according to one embodiment. The e-commerce platform 100 may be used to provide merchant products and services to customers. While the present disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a "merchant" and a "customer" may be more than individuals, for simplicity the description herein may generally refer to merchants and customers (or "purchasers") as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g. a seller, retailer, wholesaler, or provider of products), a customer-user (e.g. a buyer, purchase agent, or user of products), a prospective user (e.g. a user browsing and not yet committed to a purchase, a user evaluating the e-commerce platform 100 for potential use in marketing and selling products, and the like), a service provider user (e.g. a shipping provider 112, a financial provider, and the like), a company or corporate user (e.g. a company representative for purchase, sales, or use of products, an enterprise user, a customer relations or customer management agent, and the like), an information technology user, a computing entity user (e.g. a computing bot for purchase, sales, or use of products), and the like.

The e-commerce platform 100 may provide a centralized system for providing merchants with online resources and facilities for managing their business. The facilities described herein may be deployed, in part or in whole, through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g. a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g. "brick-and-mortar" retail stores), a merchant off-platform website 104 (e.g. a commerce Internet website or other internet or web property or asset supported by or on behalf of the merchant separately from the e-commerce platform), and the like. However, even such other merchant commerce facilities may be incorporated into the e-commerce platform, such as where POS devices 152 in a physical store of a merchant are linked to the e-commerce platform 100, where a merchant off-platform website 104 is tied to the e-commerce platform 100, such as through "buy buttons" that link content from the merchant off platform website 104 to the online store 138, and the like.

The online store 138 may represent a multitenant facility comprising a plurality of virtual storefronts. In some embodiments, merchants may manage one or more storefronts in the online store 138, such as through a merchant device 102 (e.g. computer, laptop computer, mobile computing device, and the like), and offer products to customers through a number of different channels 110A-B (e.g. an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop-ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure, the terms "online store" and "storefront" may be used synonymously to refer to a merchant's online e-commerce offering presence generally, or a merchant's online e-commerce presence through the e-commerce platform 100, where an online store 138 may refer to the multitenant collection of storefronts supported by the e-commerce platform 100 (e.g. for a plurality of merchants) or to an individual merchant's storefront (e.g. a merchant's online store).

In some embodiments, a customer may interact through a customer device 150 (e.g. computer, laptop computer, mobile computing device, and the like), a POS device 152 (e.g. retail device, a kiosk, an automated checkout system, and the like), or any other commerce interface device known in the art. The e-commerce platform 100 may enable merchants to reach customers through the online store 138, through POS devices 152 in physical locations (e.g. a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g. accessed by users using a client, such as a thin client, via a web browser or other application, accessed through by POS devices, and the like). In some embodiments, elements of the e-commerce platform 100 may be implemented to operate on various platforms and operating systems, such as iOS™, Android™, on the web, and the like (e.g. the administrator 114 being implemented in multiple instances for a given online store for iOS™, Android™, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150, and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g. add products to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store 138 may implement a content management system for website content. Merchants may author blog posts or static pages and publish them to their online store 138, such as through blogs, articles, and the like, as well as configure navigation menus. Merchants may upload images (e.g. for products), videos, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g. through an e-commerce platform shipping facility or through a third-party shipping carrier), such as providing merchants with real-time updates, tracking, automatic rate calculation, bulk order preparation, label printing, and the like.

Figure 2:
FIG. 2 is an example of a home page of an administrator, according to an example embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store, POS devices, and/or a buy button. The administrator 114 may also include interfaces for managing applications installed on the merchant's account, and settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g. days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g. a card server), to reconcile financials, bill merchants, perform automated clearing house (ACH) transfers between an e-commerce platform 100 financial institution account and a merchant's bank account (e.g. when using capital), and the like. These systems may have Sarbanes-Oxley Act (SOX) compliance and a high level of diligence required in their development and operation. The financial facility 120 may also provide merchants with financial support, such as through the lending of capital (e.g. lending funds, cash advances, and the like) and provision of insurance. In addition, the e-commerce platform 100 may provide for a set of marketing and partner services and control the relationship between the e-commerce platform 100 and partners. They may also connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation, and data management to enable support and services to the plurality of online stores 138 (e.g. related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services. The applications 142A may be provided internal to the e-commerce platform 100 or applications 142B may be provided from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g. sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion in the commerce management engine 136 may need to exceed a core functionality threshold through which it may be determined that the function is core to a commerce experience (e.g. common to a majority of online store activities, such as across channels, administrator interfaces, merchant locations, industries, product types, and the like), is re-usable across online stores 138 (e.g. functions that can be re-used/modified across core functions), limited to the context of a single online store 138 at a time (e.g. implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a rapid and accurate checkout. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. Thus, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g. that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g. app: "engine, surface my app data in mobile and web admin using the embedded app SDK"), and/or where the commerce management engine 136 is able to ask the application to perform work on demand (e.g. engine: "app, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as by utilizing APIs to expose the functionality and data available through and within the commerce management engine 136 to the functionality of applications (e.g. through REST, GraphQL, and the like). For instance, the e-commerce platform 100 may provide API interfaces 140A-B to merchant and partner-facing products and services, such as application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g. as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g. merchandising, inventory, discounts, fulfillment, and the like) and online store tasks (e.g. applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over or be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, for synchronizing a local database, notifying an external integration partner, and the like. Update events may enable this functionality without having to constantly poll the commerce management engine 136 to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g. via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128 functionalities. Application search, recommendation and support 128 may include developer products and tools to aid in the development of applications, an application dashboard (e.g. to provide developers with a development interface, to administrators for management of applications, to merchants for customization of applications, and the like), facilities for installing and providing permissions with respect to providing access to an application 142A-B (e.g. for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized for application development performed by any entity, including the merchant developing their own application 142A-B, a third-party developer developing an application 142A-B (e.g. contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g. through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, and integration applications. Customer-facing applications 142A-B may include online store 138 or channels 110A-B that are places where merchants can list products and have them purchased (e.g. the online store, applications for flash sales (e.g. merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g. through applications related to the web or website or to mobile devices), run their business (e.g. through applications related to POS devices), to grow their business (e.g. through applications related to shipping (e.g. drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g. a "default variant" is created for a product without any options). To facilitate browsing and management, products may be grouped into collections, provided product identifiers (e.g. stock keeping unit (SKU)), and the like. Collections of products may be built by either manually categorizing products into one (e.g. a custom collection), by building rulesets for automatic classification (e.g. a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g. for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g. in an abandoned checkout feature). For those reasons, checkouts can have much longer lifespans than carts (hours or even days) and are therefore persisted. Checkouts may calculate taxes and shipping rates based on the customer's shipping address. Checkout may delegate the calculation of taxes to a tax component and the calculation of shipping rates to a delivery component. A pricing component may enable merchants to create discount codes (e.g. "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g. a set of prerequisites that when met imply a set of entitlements). For instance, prerequisites may be items such as "the order subtotal is greater than $100" or "the shipping rate is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency, or a store of value (such as dollars or a cryptocurrency) to and from customers and merchants. Communication with the various payment providers (e.g. online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g. where the customer is redirected to another website), manually (e.g. cash), online payment methods (e.g. online payment systems, mobile payment systems, digital wallet, credit card gateways, and the like), gift cards, and the like.

At the end of the checkout process, an order is created. An order is a contract of sale between the merchant and the customer where the merchant agrees to provide the goods and services listed on the orders (e.g. order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts, to avoid over-selling (e.g. merchants may control this behavior from the inventory policy of each variant). Inventory reservation may have a short time span (e.g. minutes) and may need to be very fast and scalable to support flash sales (e.g. a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order, or incoming from an inventory transfer component (e.g. from a vendor).

The merchant may then review and fulfill (or cancel) the order. A review component may implement a business process merchants use to ensure orders are suitable for fulfillment before actually fulfilling them. Orders may be fraudulent, require verification (e.g. ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g. credit card information) or wait to receive it (e.g. via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g. at merchant managed locations) used when the merchant picks and packs the products in a box, purchase a shipping label and input its tracking number, or just mark the item as fulfilled. A custom fulfillment service may send an email (e.g. a location that doesn't provide an API connection). An API fulfillment service may trigger a third party, where the third-party application creates a fulfillment record. A legacy fulfillment service may trigger a custom API call from the commerce management engine 136 to a third party (e.g. fulfillment by Amazon). A gift card fulfillment service may provision (e.g. generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. Conditions may be imposed on returns, such as requiring that they be initiated within a set period (e.g. 30 days) of the original order date. The business process merchants may go through to "un-sell" an item may be implemented by a return component. Returns may consist of a variety of different actions, such as: a re-stock, where the product that was sold actually comes back into the business and is sellable again; a refund, where the money that was collected from the customer is partially or fully returned; an accounting adjustment noting how much money was refunded (e.g. including if there was any re-stocking fees, or goods that weren't returned and remain in the customer's hands); and the like. A return may represent a change to the contract of sale (e.g. the order), and where the e-commerce platform 100 may make the merchant aware of compliance issues with respect to legal obligations (e.g. with respect to taxes). In some embodiments, the e-commerce platform 100 may enable merchants to keep track of changes to the contract of sales over time, such as implemented through a sales model component (e.g. an append-only date-based ledger that records sale-related events that happened to an item).

Product Inventory Control Engine

Inventory management is a crucial aspect of implementing an e-commerce platform. Inventory tracking data, such as available inventory levels, inventory locations, stock of product variants, etc., informs both customers' and merchants' actions in a product purchase workflow. When browsing a merchant's products, customers can use inventory data to determine, for example, whether there is available stock of a product (or variants) for purchase, how many units of a product to purchase, and mode of delivery of a purchased product. Merchants can use inventory data, for example, when selecting fulfilment strategies for customer orders, making re-stocking or inventory transfer decisions, and ascertaining available inventory of products.

Typical implementations of inventory management systems provide inventory count and inventory location data. An inventory management service may output, for various products that are offered for sale, current inventory levels, inventory locations and stock at each location, and expected time until re-stock. These services rely on event data for events, such as product purchases and re-stocking, that result in changes to inventory levels in order to track inventory levels. For example, an inventory management service may increment/decrement values of inventory levels for a product at a retail location in response to detecting product-related events, such as re-stocking, sales, or product returns, for the retail location. More generally, an inventory management service may output available inventory information for products as numerical values (i.e. remaining quantities of products) or as descriptors (i.e. "available" or "unavailable"), which may be determined through standard inventory updating mechanisms associated with product-related events.

Inventory levels for products may change rapidly. As a result of various product-related events, inventory count of a product may increase (e.g. re-stocking) or decrease (e.g. sale to customers). For customers and merchants alike, accurate count of inventory and timely delivery of the count data are crucial for decision-making. For example, an overcount or late delivery of count information may result in customers purchasing more units of a product than are actually available, an error which may go unnoticed for an extended period of time during the fulfilment process. As another example, an undercount or late delivery of count information may potentially result in lost sales, misguided re-stocking decisions, and adverse customer opinions of merchants. Accordingly, real-time, or near real-time, updating of inventory information may be desired or required.

Traditional inventory management services do not account for dynamic transfer of inventory between inventory locations (e.g. retail stores, warehouses, etc.). The inventory information provided by these services does not reflect dynamic changes to inventory availability at specific locations which may be realized through inventory transfer events. In particular, typical inventory management systems are not adapted for automatically or directly providing anticipated inventory availability at specific locations based on dynamic tracking of actual and possible inventory transfer events for those locations.

Transfer of inventory between locations is typically performed as a result of manual requests by individuals, such as managers and employees, at a merchant's retail locations. For example, when the stock of a product at a retail store falls below a threshold level, an inventory transfer request may be made for moving available inventory from one or more other locations to the store. Inventory transfer for locations is thus reactionary (i.e. responsive to product-related events, such as sales) and manually driven. This represents another potential technical limitation for existing inventory management systems.

The proposed solutions disclosed in the present application address the technical limitations associated with managing inventory of products that are offered for sale in an on-line store. An inventory control engine that provides predicted inventory availability of products at selected locations is described. More particularly, the inventory control engine enables customers to determine availability of products for local pick-up at a selected location (beginning at a future time) based on predicted arrival time of units of the products from other locations (e.g. inventory transfer from other retail stores, re-stock from warehouses, etc.). The inventory control engine determines an inventory transfer time, which represents the time required for transferring inventory to a selected location from another location having available inventory, based on tracking real-time and possible inventory movements. The inventory transfer time forms the basis for determining the earliest time of availability of specific quantities of a product at the selected location. The earliest time of availability data may be presented to customers, for example, via a merchant's online storefront such as, for example, using a user interface associated with the merchant's online store.

The disclosed inventory control engine also enables automatically initiating inventory transfer requests. In particular, the earliest time of availability data for local pick-up allows customers to place an order for a product that is currently unavailable at a selected location, thereby initiating a request to transfer inventory of the product to the location in accordance with the order (e.g. product quantity as specified in the order). This represents a technical implementation of an inventory transfer request system that does not rely on manual intervention (for example, by employees of a merchant's retail locations), and is instead based on tracking of anticipated inventory movement between inventory locations.

The disclosed inventory control engine also facilitates an improved user experience for customers of a merchant's online store. As explained above, existing e-commerce systems are limited in the inventory availability data that can be provided to customers. The inventory control engine of the present disclosure allows enhanced and more extensive customization of the user interface for a merchant's online store to account for individual customer data, such as customer location and delivery preference data. In particular, the user interface is adapted to display, in real-time, local pick-up availability data at customer-designated locations. The improved user interface effectively expands the scope of product offerings and purchase options for customers on an e-commerce platform.

Figure 3:
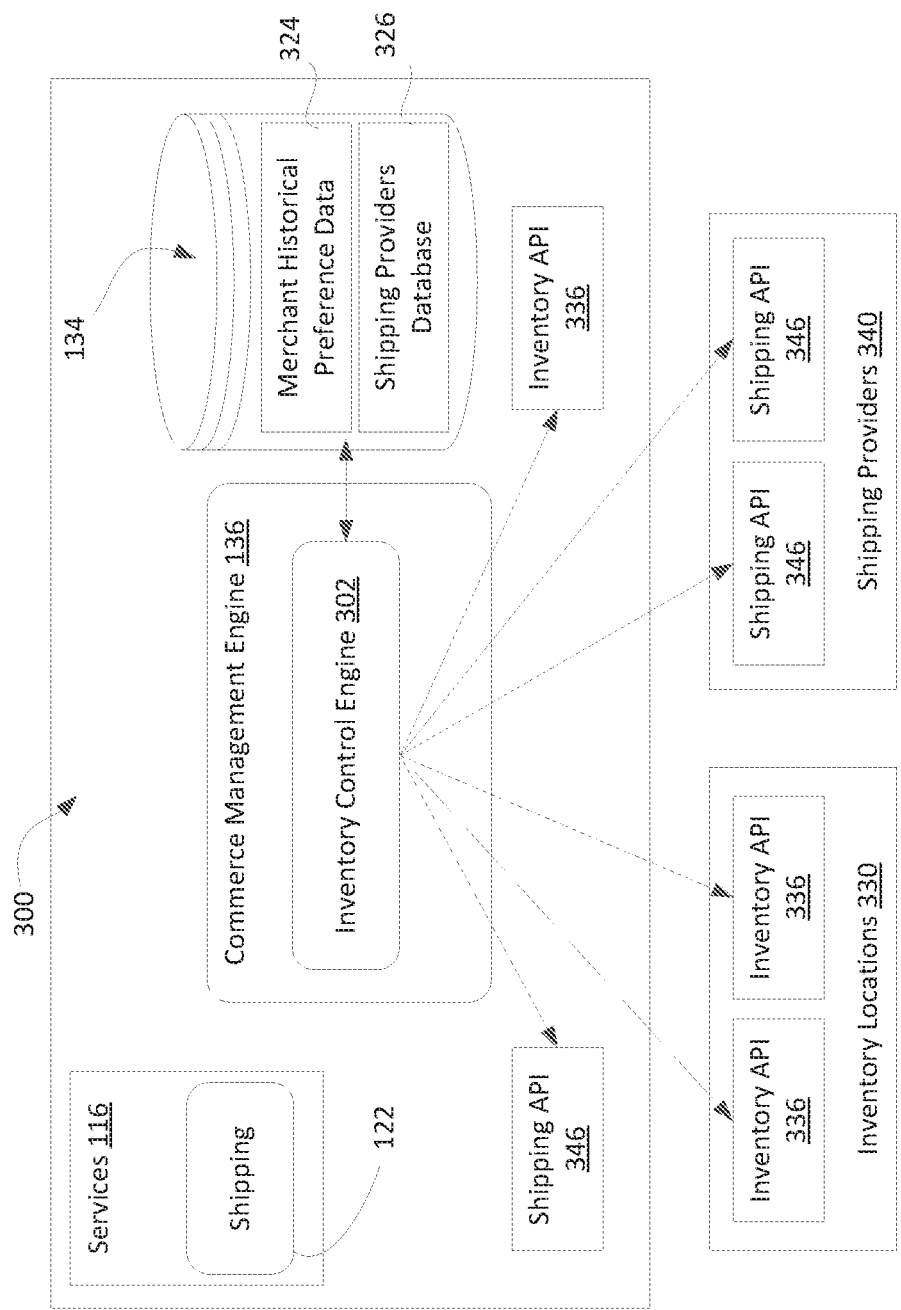
FIG. 3 partially illustrates an example e-commerce platform in block diagram form.

Reference is made to FIG. 3, which illustrates an example e-commerce platform 300 in block diagram form. Not all components of the e-commerce platform 300 are illustrated. The e-commerce platform 300 includes the commerce management engine 136, services 116, and the data facility 134. The commerce management engine 136 includes an inventory control engine 302. The inventory control engine 302 may be a software-implemented module containing processor-executable instructions that, when executed by one or more processors in the e-commerce platform 300, cause the e-commerce platform 300 to carry out some of the processes and functions described herein. Although illustrated as a standalone module within the commerce management engine 136, it will be appreciated that the inventory control engine 302, or parts of it, may be implemented within one or more of the applications 142A-B, and/or within other components of the commerce management engine 136. Additionally, or alternatively, the inventory control engine 302 may be provided as a service that is external to the e-commerce platform 300. In particular, the e-commerce platform 300 may engage the inventory control engine 302 as a service that is independent of the e-commerce platform 300 and which facilitates inventory management of products that are offered for sale on the e-commerce platform 300. More broadly, the inventory control engine 302 may be provided a separate service in no way coupled to a particular e-commerce platform, for example, to control inventory for products offered in an on-line store or storefront not hosted on a platform.

In the illustrated embodiment, the inventory control engine 302 is configured to manage inventory of products that are offered for sale on platform 300. The inventory control engine 302 receives data inputs from merchant devices defining product data for the products that are offered by the merchants.

The inventory control engine 302 is communicably connected to a data facility 134. In the example of FIG. 3, the data facility 134 is shown as being integral to the e-commerce platform 300 but may be external to it in other implementations. The data facility 134 may include one or more data storage units. In some cases, the data storage may be in database format and may include one or more databases. The databases may be relational databases, in some examples. The data facility 134 is illustrated as a single unit for ease of illustration, but may include a plurality of storage units and, in some cases, storage media connected via network and external to the e-commerce platform 300. The inventory control engine 302 is configured to access one or more of the storage units of data facility 134. For example, the inventory control engine 302 may formulate database queries for retrieving merchant historical preference data 324 and/or data from a shipping providers database 326.

The data facility 134 may store data collected by the e-commerce platform 300 based on the interaction of merchants and customers with the e-commerce platform 300. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 300, may also be collected and stored in the data facility 134. Such customer data is obtained on the basis of inputs received via customer devices associated with the customers/prospective purchasers. By way of example, historical transaction event data including details of purchase transaction events by customers on the e-commerce platform 300 may be recorded and such transaction event data may be considered customer data. Such transaction event data may indicate product identifiers, date/time of purchase, final sale price, purchaser information (including geographical region of customer), and payment method details, among others. Other data vis-à-vis the use of platform 300 by merchants and customers (or prospective purchasers) may be collected and stored in the data facility 134.

The merchant historical preference data 324 includes data indicating the historical preference of merchants with respect to their practice for determining delivery options for their products. For example, a merchant may have existing rules, preferences, and/or conditions in place for deciding on delivery options for products that are acceptable to present to prospective customers.

An inventory location 330 is typically, but not limited to, a vendor, seller, or source that may have, or may make available, or may manufacture, inventory of a product. An inventory location 330 may be a brick-and-mortar location (e.g. a retail store or warehouse), may be operated or controlled by a merchant or, alternatively, a third party to a merchant such as a third party logistics or product provider, or may be a logical source from which the product can be obtained (e.g. another online source) with the capability of the product being shipped to a destination. In some embodiments, an inventory location 330 may be capable of making or manufacturing a product, optionally with product components and labor on site, or alternatively also have an internal or external source for a product (e.g. outsourcing, drop shipment, and the like) and the inventory assessment for such location may consider the products that can be made or manufactured (such as, for example, by considering available (e.g. on hand) components, parts and labor) and not only the products present at the location.

In some embodiments, inventory information may include, without limitation, availability, quantity, and condition (e.g. new, refurbished, used, and the like) of product (s) at one or more inventory locations 330. Inventory information may be obtained internal or external to an e-commerce platform 100, and may be acquired by database lookups, API calls, or other computing operations. Inventory information may consider products which may be created, manufactured, or otherwise sourced for prospective or completed transactions, either in real-time or under just-in-time practices or other timeframes, for a particular application or product.

A shipping provider 340 may be a shipping carrier (e.g. UPS, FedEx, shipping capabilities of the platform 100, or the like) that provides shipping services, but it may also be any party capable of transporting, delivering, or rendering a product to a designated destination.

In some embodiments, shipping information may include, without limitation, available shipping providers 340 and/or shipping services available (e.g. one-day, two-day, air, ground, and the like). It may also include weight, dimensions, dimensional weight, oversize parameters, handling times, shipping times, shipping costs/rates, restrictions, handling instructions, insurance, proof of delivery/acceptance parameters, customs parameters, Harmonized Commodity Description and Coding System or HTS considerations, tax parameters, origin and destination parameters, and other information related to fulfillment, transport, rendering, or delivery of a product to a destination. Shipping information may also include information on download (such as for a digital or electronic product), freight, pickup, installation, or custom or other arrangements for fulfillment or delivery of a product. Shipping information may be obtained internal or external to an e-commerce platform 100, and may be acquired by database lookups, API calls, or other computing operations.

An API refers to an application programming interface under the conventional definition known in the art, or any software, platform, or communication means that may allow two computing devices or systems to exchange information, such as inventory or shipping information. For example, a shipping provider 340 may have a shipping API 346 to allow its customers and other parties to retrieve shipping rates and other information relating to its product and service offerings. An e-commerce platform 300 therefore may request information from the shipping provider 340 for a given prospective shipment via the shipping provider's 340 API, and such a request from the e-commerce platform 300 to the shipping provider 340 may be an API call. In such an example, when the shipping provider 340 responds to the e-commerce platform 300 API call that was made, the reply may be an API response. Similarly, inventory locations 330 may have inventory APIs 336 for providing inventory information, such as availability and condition of products.

Figure 4:
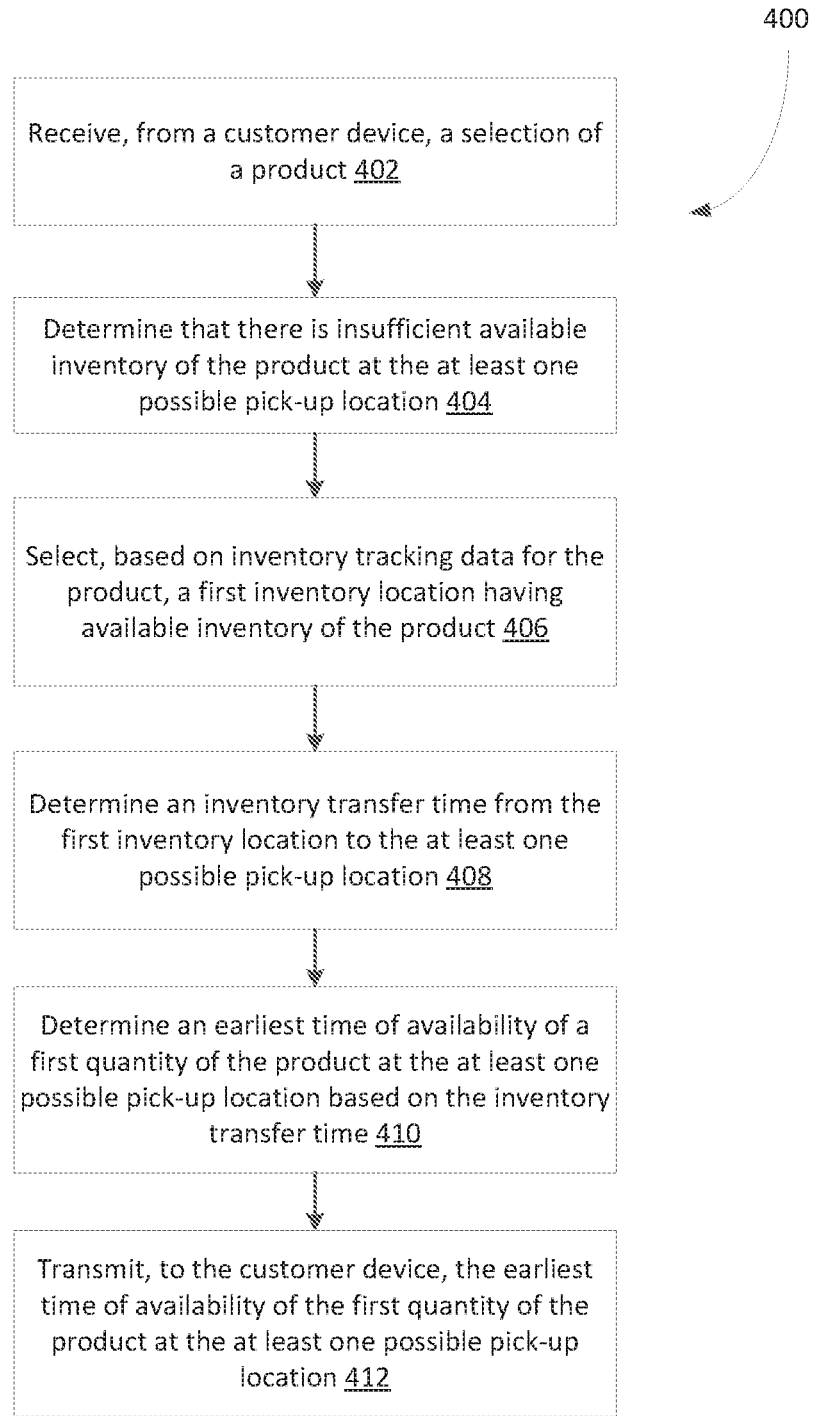
FIG. 4 shows, in flowchart form, an example method for controlling inventory availability associated with products.

Reference is now made to FIG. 4, which shows, in flowchart form, an example method 400 for controlling inventory availability associated with products. The method 400 may be performed by a computing system implementing an inventory control service (such as the inventory control engine 302 of FIG. 3). The inventory control engine may perform the operations of method 400 when managing inventory of products that are offered for sale by merchants on an e-commerce platform. In particular, the method 400 may be performed in providing customized inventory availability data for a customer on the e-commerce platform. As detailed above, the inventory control engine may be a service that is provided within or external to the e-commerce platform to facilitate, among others, sales and order processing activities on the platform.

In operation 402, the inventory control engine receives, from a customer device, a selection of a product. In at least some embodiments, the selection may be made by a customer in a product browsing session on the e-commerce platform using the customer's device. For example, the customer may input a selection of a product from a catalog that is displayed on a webpage associated with a merchant's online store. That is, the selection may be made using a browser application, or the like, on the customer's device. By selecting a product, the customer may navigate to a product webpage associated with the product. The product webpage may display, with or without user input, inventory availability information for the selected product. In particular, the product webpage may display information indicating whether the selected product is available for purchase, remaining stock of the selected product, or time until (or of) next re-stock of the selected product if there is no currently available inventory.

In operation 404, the inventory control engine determines, based on stored inventory data for the at least one possible pick-up location, that there is insufficient available inventory of the product at the at least one possible pick-up location. The at least one possible pick-up location for a customer may be designated in various different ways. For example, the at least one possible pick-up location may be selected by the customer using the customer's device (e.g. selection of a local pick-up location on the product webpage). As another example, the at least one possible pick-up location may be a location that is set as a preferred pick-up location in the customer's account profile or configuration. As yet another example, the inventory control engine may obtain the current location of the customer's device and identify one or more local pick-up locations based on the detected device location. For example, the customer may input, on the customer's device, their current location (or information for identifying their current location) and have nearby pick-up locations identified in real-time.

The inventory control engine retrieves stored inventory data for selected product at the at least one possible pick-up location. The inventory data may be retrieved associated with the at least one possible pick-up location (which may be an inventory location such as a retail store or warehouse) such as, for example, via one or more calls to an inventory API. The inventory control engine may determine that there is insufficient available inventory of the product if the stock of the selected product at the at least one possible pick-up location is below a threshold. For example, if the selected product is not available (i.e. stock is zero) or if the stock is less than a quantity selected by the customer (for example, the customer's desired quantity for an order for the product), the available inventory may be determined to be insufficient.

In response to determining that there is insufficient available inventory of the product at the at least one possible pick-up location, the inventory control engine selects, based on inventory tracking data for the product, a first inventory location having available inventory of the product, in operation 406. The first inventory location may be identified based on tracking data associated with inventory of the selected product. In some embodiments, the inventory control engine may maintain tracking data indicating current locations having inventory of product items. The inventory control engine may, for example, query one or more inventory locations for the product item, via calls to the associated inventory APIs, and obtain inventory data in real-time based on the query results.

In operation 408, the inventory control engine determines an inventory transfer time from the first inventory location to the at least one possible pick-up location based on the first inventory location, the at least one possible pick-up location, and inventory transfer data. The inventory transfer time represents a minimum amount of time that is required for transferring inventory of the selected product to the at least one possible pick-up location. In at least some embodiments, the inventory transfer time is determined based on travel time of inventory transfer vehicles between the first inventory location and the at least one possible pick-up location. The inventory transfer data, which is maintained or accessible by the inventory control engine, may include real-time location tracking data for one or more inventory transfer vehicles. The inventory transfer vehicles may, for example, be vehicles that are owned and/or operated by the merchant of the selected product for moving inventory between inventory locations. In some embodiments, the real-time location of such inventory transfer vehicles may be tracked, either directly by the inventory control engine or by another service that is accessible by the inventory control engine.

The inventory transfer data may, in some embodiments, indicate fixed route schedule data for one or more inventory transfer vehicles, and the inventory transfer time may be determined based on the route schedule data. The route schedule data for inventory transfer vehicles may indicate scheduled inventory pick-up and drop off activities of the vehicles. For example, the route scheduled data may identify pick-up/drop-off locations, times of scheduled pick-up/drop-off, and product data for inventory that is picked up and/or dropped off.

In some embodiments, the inventory transfer time may be determined based on querying a transfer service for transfer time data. The transfer service may, for example, be a shipping or carrier service. The inventory control engine may obtain, via API calls to the shipping/carrier services, vehicle availability data, route schedule data, etc. Additionally, or alternatively, the inventory control engine may request that the transfer service provide transfer time based on parameters (e.g. first inventory location, at least one pick-up location, etc.) associated with an inventory transfer action that is provided by the inventory control engine.

The inventory transfer time may be determined based on one or more of the above-mentioned factors, i.e. real-time transfer vehicle location tracking data, fixed route schedule data, transfer time data from one or more transfer services, in combination with additional data (e.g. local traffic data, etc.) which may be obtained by the inventory control engine.

In operation 410, the inventory control engine determines an earliest time of availability of a first quantity of the product at the at least one possible pick-up location based on the inventory transfer time. The earliest time of availability represents a future time when the first quantity of the product is expected to be available at the at least one possible pick-up location. The inventory control engine may determine the earliest time of availability by adding, at least, the inventory transfer time to a current time. In some embodiments, the earliest time of availability may be delayed by an amount of time associated with processing of the product prior to pick-up availability. For example, if the selected product requires additional handling (e.g. packaging, assembly, etc.) at the at least one possible pick-up location, the earliest time of availability may be delayed by the amount of time required (or expected) for such handling.

In operation 412, the inventory control engine transmits, to the customer device, the earliest time of availability of the first quantity of the product at the at least one possible pick-up location. The earliest time of availability is transmitted to the customer device for presenting, by the customer device, as available inventory at the at least one pick-up location for pick up after the earliest time of availability. For example, the earliest time of availability for local pick-up may be presented on a product information and/or ordering webpage that is displayed in a browser application on the customer's device. That is, the earliest time of availability data may be provided to the customer device via a web server associated with the product webpage (and more generally, the merchant's online store).

Figure 5:
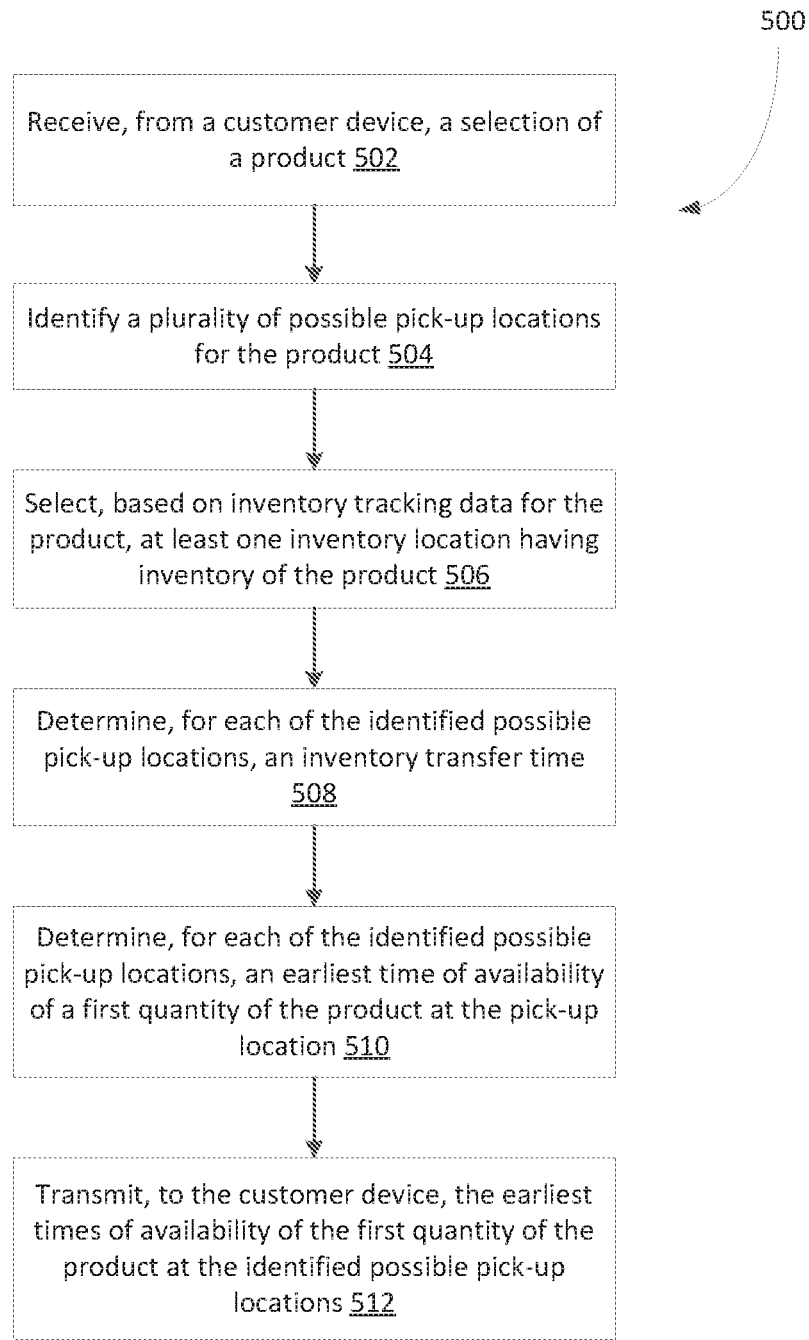
FIG. 5 shows, in flowchart form, another example method for controlling inventory availability associated with products.

Reference is now made to FIG. 5, which shows, in flowchart form, another example method 500 for controlling inventory availability associated with products. The method 500 may be performed by a computing system implementing an inventory control service (such as the inventory control engine 302 of FIG. 3). The inventory control engine may perform the operations of method 500 when managing inventory of products that are offered for sale by merchants on an e-commerce platform. In particular, the method 500 may be performed in providing customized inventory availability data for a customer on the e-commerce platform. It will be understood that the inventory control engine may be configured to perform the operations of method 500 in addition to and/or in combination with one or more of the operations of method 400 of FIG. 4 when managing inventory of products that are offered for sale on an e-commerce platform.

In operation 502, the inventory control engine receives, from a customer device, a selection of a product. The operation 502 corresponds to, and may be performed in a similar manner as, operation 402 of method 400.

In operation 504, the inventory control engine identifies a plurality of possible pick-up locations for the product. In particular, the inventory control engine identifies two or more possible pick-up locations. That is, two or more possible locations where the customer may pick up the selected product at a future time are identified. The plurality of possible pick-up locations may, in some embodiments, be a set of inventory locations (e.g. retail store, warehouse, etc.). For example, the plurality of possible pick-up locations may be a set of inventory locations that are in a defined geographic relation to a customer location (such as detected location of the customer's device, default location set in the customer's account, etc.). For example, the plurality of possible pick-up locations may include those inventory locations that are within a certain threshold distance (e.g., one or more of radius, travel time, etc.) from the customer's location. As another example, the plurality of possible pick-up locations may include inventory locations that have a same geographic identifier (e.g. street, neighbourhood, city, etc.) as the customer's location.

In operation 506, the inventory control engine selects, based on inventory tracking data for the product, at least one inventory location having inventory of the selected product. In some embodiments, the at least one inventory location may include two or more inventory locations that have inventory of the product. More particularly, the inventory control engine may select, based on the inventory tracking data for the product, a first inventory location and at least one second inventory location (different from the first inventory location) having available inventory of the product. By identifying multiple inventory locations with available inventory, the inventory control engine may have flexibility to combine inventory from the different inventory locations to satisfy requests for different quantities of the selected product.

In operation 508, the inventory control engine determines, for each of the identified possible pick-up locations, an inventory transfer time from the at least one inventory location to the possible pick-up location. In those embodiments where multiple inventory locations are identified as having inventory of the product, the inventory control engine may determine inventory transfer times by identifying the shortest travel time from any one of the inventory locations to the at least one possible pick-up location. The inventory transfer times may be determined in a similar manner as for the operation 408 of method 400. In particular, the inventory control engine may determine inventory transfer times based on, at least, real-time transfer vehicle location tracking data, fixed route schedule data, transfer times data from one or more transfer services, in combination with additional data (e.g. local traffic data) that is available to the inventory control engine.

In operation 510, the inventory control engine determines, for each of the identified possible pick-up locations, an earliest time of availability of a first quantity of the selected product at the pick-up location, based on the respective inventory transfer time. In operation 512, the inventory control engine transmits, to the customer device, the earliest times of availability of the first quantity of the product at the identified possible pick-up locations. In at least some embodiments, the inventory control engine may retrieve identifying information for the plurality of possible pick-up locations and transmit, to the customer device, the identifying information and the earliest times of availability of the first quantity of the product at the plurality of possible pick-up locations.

Figure 6:
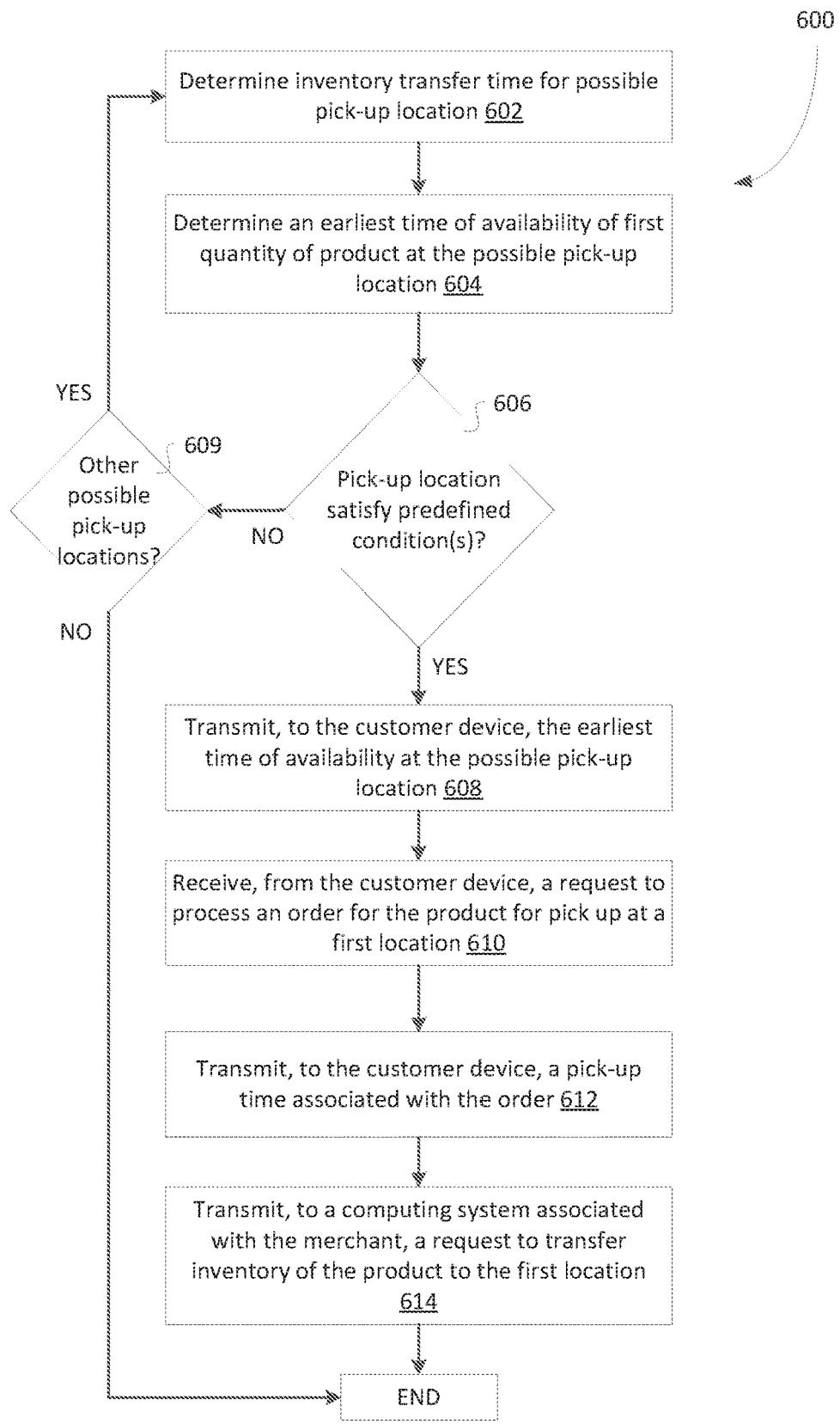
FIG. 6 shows, in flowchart form, an example method for processing an order for a product.

Reference is now made to FIG. 6, which shows, in flowchart form, an example method 600 for processing an order for a product. The method 600 may be implemented by an e-commerce platform, such as e-commerce platform 300 (FIG. 3). The platform may perform the operations of method 600 in conjunction with an inventory control service (such as the inventory control engine 302 of FIG. 3), which may be implemented by, or external to, the platform.

In operation 602, the platform determines inventory transfer time for a possible pick-up location. In operation 604, the platform determines an earliest time of availability of a first quantity of the product at the possible pick-up location. The operations 602 and 604 may be performed in accordance with the embodiments described above in relation to methods 400 and 500.

In operation 606, the platform checks whether the possible pick-up location satisfies one or more predefined conditions. A merchant may define one or more "conditions" to help to guide the decision of whether to offer, to a customer, local pick-up at a particular pick-up location as a delivery option for a selected product. The predefined conditions may relate to, for example, profit margin of the product, expected travel distance required for transferring inventory to the pick-up location, and/or route schedules for available transfer vehicles. By way of example, if a customer wishes to purchase certain units of a product and the total profit on the prospective order is less than a threshold amount and/or would require an extended unplanned vehicle journey for transferring the units to the pick-up location, it may not be desirable for the merchant to offer the pick-up as a delivery option for the customer. A predefined condition may be associated with a threshold value (e.g. minimum profit margin, maximum travel distance, etc.), and evaluating whether a particular pick-up location satisfies the predefined condition may include comparing one or more values (e.g. expected profit, distance from inventory location, etc.) associated with offering local pick-up at the pick-up location against the relevant threshold values. The threshold values and, more generally, the rules associated with any predefined conditions may, in some embodiments, be defined by the merchant and stored in memory that is accessible by the platform.

If the pick-up location satisfies the one or more predefined conditions, the platform transmits, to the customer device, the earliest time of availability for the first quantity of the product at the possible pick-up location, in operation 608. That is, the earliest time of availability is transmitted to the customer device responsive to determining that at least one, or all, of the predefined conditions is satisfied. The earliest time of availability may be determined in accordance with above described embodiments.

If, on the other hand, the pick-up location does not satisfy one, at least one, or all of the predefined conditions, the platform performs a similar analysis for a next one of the possible pick-up locations. This process of analyzing the one or more predefined conditions may be iterated through a given set of possible pick-up locations that are identified for a customer, to determine which of the pick-up options may be desirable for the merchant of the selected product. In particular, in operation 609, the platform checks whether there are other possible pick-up locations for which the predefined conditions can be analyzed. If there is another possible pick-up location, the method 600 returns to operation 602 and determines inventory transfer time for the location. When there are no other possible pick-up locations, the method 600 ends, with no offer of local pick-up for the product being provided to the customer.

In this way, the platform can present, to the customer device, those options for local pick-up of the selected product that are desirable for the merchant of the product. For example, the platform can provide those pick-up options that are profitable for the merchant when orders for the product are processed. In operation 610, the platform receives, from the customer device, a request to process an order for the product for pick-up at a first pick-up location. The request may, in at least some embodiments, include identifying information for the first pick-up location. The platform transmits, to the customer device, a pick-up time associated with the order, in operation 612. In operation 614, the platform transmits, to a computing system associated with the merchant, a request to transfer inventory of the product to the first pick-up location.

Figure 7:
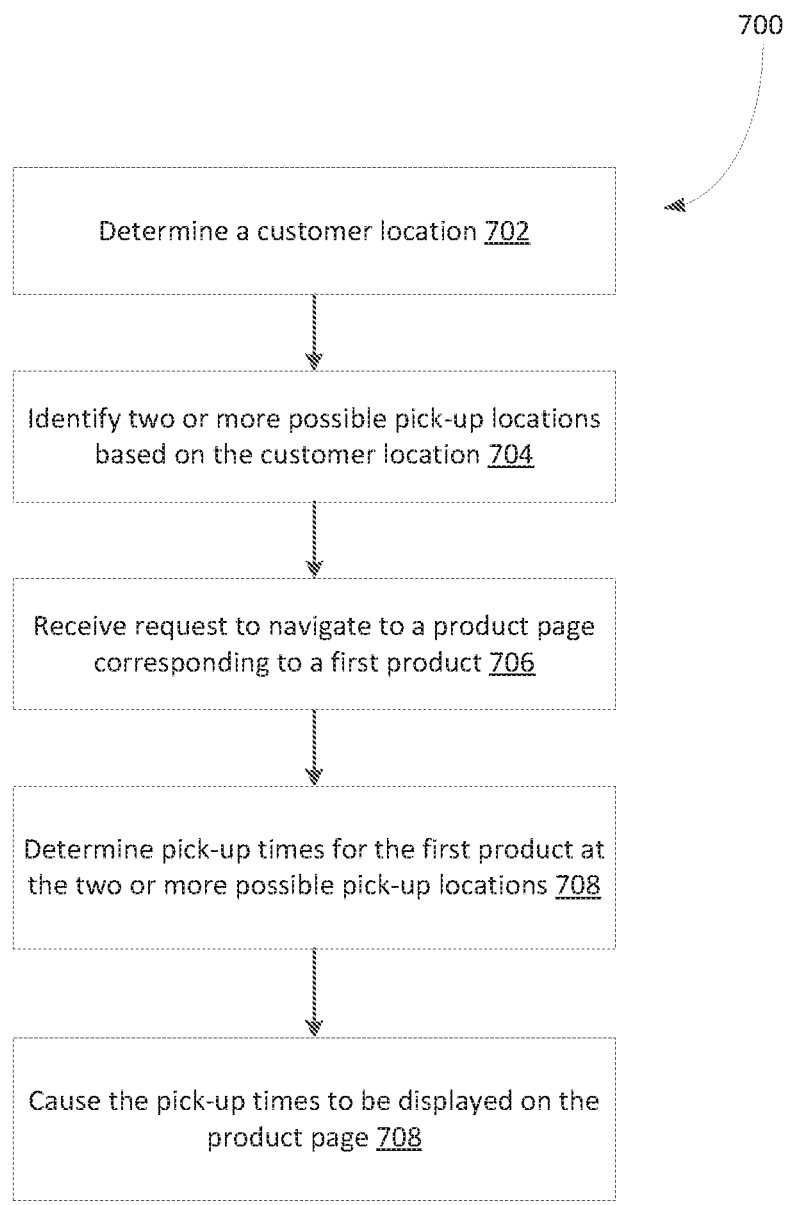
FIG. 7 shows, in flowchart form, an example method for providing a user interface associated with an e-commerce platform.

Reference is now made to FIG. 7, which shows, in flowchart form, an example method 700 for providing a user interface associated with an e-commerce platform. The method 700 may be implemented by an e-commerce platform, such as e-commerce platform 300 (FIG. 3). In at least some embodiments, the method 700 may be at least partially implemented by a server of the e-commerce platform that provides a webpage associated with an online store of a merchant. In the description below, references to "webpage" are intended to include any graphical user interface for browsing a merchant's catalog (e.g. a mobile app, etc.).

In operation 702, the platform determines a customer location for a customer. The customer location may, for example, be a location that is input by the customer, a default location configured as an account setting for the customer, or a detected location for a customer device associated with the customer (e.g. via an IP address, GPS data, etc.).

In operation 704, the platform identifies two or more possible pick-up locations based on the device location. The possible pick-up locations may, for example, be retail stores, drop-off stations, warehouses, etc. that are determined to be in a certain geographic relation to the customer location. For example, the possible pick-up locations may be those locations offering pick-up services that are within a threshold distance (e.g. one or more of radius, travel time, etc.) from the customer's location.

In operation 706, the platform receives a request to navigate to a product page corresponding to a first product. For example, a customer who is browsing the catalog of products of a merchant may select one of the products to navigate to a product information and/or ordering webpage for the selected product.

In operation 708, the platform determines pick-up times for the first product at the two or more possible pick-up locations. The pick-up times may, for example, be earliest times of availability of a specific quantity of the first product at the possible pick-up locations. The earliest times of availability may be determined in accordance with above described embodiments. In operation 708, the platform causes the pick-up times associated with the two or more possible pick-up locations to be displayed on the product webpage. In particular, the product may be shown to be available for local pick-up at the possible pick-up locations at future times corresponding to the earliest times of availability, without express selection of a specific pick-up location by the customer.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
receiving, by a computing system via a graphical user interface on a customer computing device over a network, a user input including selection of a product, the graphical user interface comprising a webpage associated with an online storefront;
determining, by the computing system, based on inventory data for at least one possible pick-up location for the product retrieved via requests to an inventory API associated with the at least one possible pick-up location, that there is insufficient available inventory of the product at the at least one possible pick-up location;
in response to determining that there is insufficient available inventory of the product at the at least one possible pick-up location:
selecting, by the computing system, based on inventory tracking data for the product, a first inventory location having available inventory of the product;
obtaining, by the computing system, location tracking data associated with one or more inventory transfer vehicles indicating real-time locations of the one or more inventory transfer vehicles;
determining, by the computing system, based on the first inventory location, the at least one possible pick-up location, and the real-time locations of the one or more inventory transfer vehicles, an inventory transfer time for transferring inventory of the product from the first inventory location to the at least one possible pick-up location, the determining including querying a transfer service over the network for the transfer time data; and
determining, by the computing system, an earliest time of availability of a first quantity of the product at the at least one possible pick-up location based on the inventory transfer time, and
causing, by the computing system, the webpage associated with the online storefront to be updated in real-time to display, on the customer computing device, local pick-up availability data representing availability of the first quantity of the product at the at least one possible pick-up location based on the determined earliest time of availability transmitted by the computing system over the network;

receiving, by the computing system via the customer computing device over the network, a request to process an order for the product for pick-up at a first one of the at least one possible pick-up location; and transmitting, by the computing system to a merchant system over the network, a request to transfer inventory of the product to the first pick-up location.

2. The method of claim 1, wherein the at least one possible pick-up location is designated based on at least one of a selection by a customer, account configuration for the customer, or a detected current location of the customer computing device.

3. The method of claim 1, wherein the inventory transfer data comprises fixed route schedule data for one or more inventory transfer vehicles indicating at least one of:
one or more pick-up or drop-off locations;
times of scheduled pick-ups or drop-offs; or
product data for inventory that is picked up or dropped off,
and wherein the inventory transfer time is determined based on the fixed route schedule data.

4. The method of claim 1, wherein the at least one possible pick-up location comprises two or more possible pick-up locations and wherein determining the earliest time of availability of the first quantity of the product comprises:
for each of the two or more possible pick-up locations:
determining, by the computing system, an inventory transfer time from the first inventory location to the possible pick-up location; and
determining, by the computing system, an earliest time of availability of the first quantity of the product at the possible pick-up location based on the respective inventory transfer time.

5. The method of claim 4, wherein causing the webpage to be updated in real-time comprises:
obtaining, by the computing system, identifying information for the two or more possible pick-up locations; and
transmitting, by the computing system to the customer computing device, the identifying information and the earliest times of availability of the first quantity of the product at the two or more possible pick-up locations.

6. The method of claim 1, further comprising:
transmitting, by the computing system to the customer computing device over the network, a pick-up time associated with the order.

7. The method of claim 6, wherein the earliest time of availability of the first quantity of the product at the at least one possible pick-up location is transmitted to the customer computing device responsive to determining that at least one condition relating to the order for the product is satisfied.

8. The method of claim 1, further comprising:
selecting, by the computing system based on the inventory tracking data for the product, at least one second inventory location having available inventory of the product; and
determining, by the computing system based on the at least one second inventory location, the at least one possible pick-up location, and the location tracking data, inventory transfer times for transferring inventory of the product from the at least one second inventory location to the at least one possible pick-up location,
wherein the earliest time of availability of the first quantity of the product at the at least one possible pick-up location is determined based on the inventory transfer times associated with the first inventory location and the at least one second inventory location.

9. An inventory control system, comprising:
a database storing data for a plurality of product items;
a processor; and
a memory storing computer-executable instructions that, when executed by the processor, are to cause the processor to:
receive, via a graphical user interface on a customer computing device over a network, a user input including selection of a product, the graphical user interface comprising a webpage associated with an online storefront;
determine, based on inventory data for at least one possible pick-up location for the product retrieved via requests to an inventory API associated with the at least one possible pick-up location, that there is insufficient available inventory of the product at the at least one possible pick-up location;
in response to determining that there is insufficient available inventory of the product at the at least one possible pick-up location:
select, based on inventory tracking data for the product, a first inventory location having available inventory of the product;
obtain location tracking data associated with one or more inventory transfer vehicles indicating real-time locations of the one or more inventory transfer vehicles;
determine, based on the first inventory location, the at least one possible pick-up location, and the real-time locations of the one or more inventory transfer vehicles, an inventory transfer time for transferring inventory of the product from the first inventory location to the at least one possible pick-up location, the determining including querying a transfer service over the network for the transfer time data; and
determine an earliest time of availability of a first quantity of the product at the at least one possible pick-up location based on the inventory transfer time, and
cause the webpage associated with the online storefront to be updated in real-time to display, on the customer computing device, local pick-up availability data representing availability of the first quantity of the product at the at least one possible pick-up location based on the determined earliest time of availability transmitted over the network;
receive, via the customer computing device over the network, a request to process an order for the product for pick-up at a first one of the at least one possible pick-up location; and
transmit, to a merchant system over the network, a request to transfer inventory of the product to the first pick-up location.

10. The inventory control system of claim 9, wherein the at least one possible pick-up location is designated based on at least one of a selection by a customer, account configuration for the customer, or a detected current location of the customer computing device.

11. The inventory control system of claim 9, wherein the inventory transfer data comprises fixed route schedule data for one or more inventory transfer vehicles indicating at least one of:
one or more pick-up or drop-off locations;
times of scheduled pick-ups or drop-offs; or
product data for inventory that is picked up or dropped off, and wherein the inventory transfer time is determined based on the fixed route schedule data.

12. The inventory control system of claim 9, wherein the at least one possible pick-up location comprises two or more possible pick-up locations and wherein determining the earliest time of availability of the first quantity of the product comprises:

for each of the two or more possible pick-up locations:
determining an inventory transfer time from the first inventory location to the possible pick-up location; and
determining an earliest time of availability of the first quantity of the product at the possible pick-up location based on the respective inventory transfer time.

13. The inventory control system of claim 12, wherein causing the webpage to be updated in real-time comprises:
obtaining identifying information for the two or more possible pick-up locations; and
transmitting, to the customer computing device, the identifying information and the earliest times of availability of the first quantity of the product at the two or more possible pick-up locations.

14. The inventory control system of claim 9, wherein the instructions, when executed, cause the processor to:
transmit, to the customer computing device over the network, a pick-up time associated with the order.

15. The inventory control system of claim 14, wherein the earliest time of availability of the first quantity of the product at the at least one possible pick-up location is transmitted to the customer computing device responsive to determining that at least one condition relating to the order for the product is satisfied.

16. The inventory control system of claim 9, wherein the instructions, when executed, cause the processor to:
select, based on the inventory tracking data for the product, at least one second inventory location having available inventory of the product; and
determine, based on the at least one second inventory location, the at least one possible pick-up location, and the location tracking data, inventory transfer times for transferring inventory of the product from the at least one second inventory location to the at least one possible pick-up location,
wherein the earliest time of availability of the first quantity of the product at the at least one possible pick-up location is determined based on the inventory transfer times associated with the first inventory location and the at least one second inventory location.

17. A computer-readable storage medium storing instructions that, when executed by a processor, cause the processor to perform operations comprising:

receiving, via a graphical user interface on a customer computing device over a network, a user input including selection of a product, the graphical user interface comprising a webpage associated with an online storefront;

determining, based on inventory data for at least one possible pick-up location for the product retrieved via requests to an inventory API associated with the at least one possible pick-up location, that there is insufficient available inventory of the product at the at least one possible pick-up location;

in response to determining that there is insufficient available inventory of the product at the at least one possible pick-up location:
selecting, based on inventory tracking data for the product, a first inventory location having available inventory of the product;
obtaining location tracking data associated with one or more inventory transfer vehicles indicating real-time locations of the one or more inventory transfer vehicles;
determining, based on the first inventory location, the at least one possible pick-up location, and the real-time locations of the one or more inventory transfer vehicles, an inventory transfer time for transferring inventory of the product from the first inventory location to the at least one possible pick-up location, the determining including querying a transfer service over the network for the transfer time data; and
determining an earliest time of availability of a first quantity of the product at the at least one possible pick-up location based on the inventory transfer time, and causing the webpage associated with the online storefront to be updated in real-time to display local pick-up availability data representing availability of the first quantity of the product at the at least one possible pick-up location based on the determined earliest time of availability transmitted over the network;

receiving, via the customer computing device over the network, a request to process an order for the product for pick-up at a first one of the at least one possible pick-up location; and transmitting, to a merchant system over the network, a request to transfer inventory of the product to the first pick-up location.

* * * * *